United States Patent

[11] 3,604,624

[72] Inventors Yotaro Miura;
Yoshiharu Matsumoto, both of Tokyo, Japan

[21] Appl. No. 47,195
[22] Filed June 18, 1970
[45] Patented Sept. 14, 1971
[73] Assignee Sony Corporation
Tokyo, Japan
[32] Priority June 30, 1969
[33] Japan
[31] 44/62186

[54] COUNTER FOR A TAPE RECORD-PLAYBACK MECHANISM
10 Claims, 2 Drawing Figs.

[52] U.S. Cl. .......... 235/103, 242/55.19, 274/11
[51] Int. Cl. .......... G04b 37/00
[50] Field of Search .......... 274/4, 11; 242/57, 199, 200, 55.19; 235/103

[56] References Cited

UNITED STATES PATENTS

| | | | |
|---|---|---|---|
| 2,894,700 | 7/1959 | Roberts et al. .......... | 242/200 |
| 2,908,769 | 10/1959 | Fonda .......... | 242/55.19 A |
| 3,167,264 | 1/1965 | Ohtsu .......... | 242/57 X |
| 3,462,055 | 8/1969 | Trott .......... | 242/55.19 A X |

FOREIGN PATENTS

| | | | |
|---|---|---|---|
| 1,124,347 | 2/1962 | Germany .......... | 242/55.19 A |

*Primary Examiner*—Richard B. Wilkinson
*Assistant Examiner*—Stanley A. Wal
*Attorneys*—Lewis H. Eslinger, Alvin Sinderbrand and Curtis, Morris & Safford

ABSTRACT: A counter for use with a video tape recorder to indicate visually the amount of time the magnetic tape in a cassette has been used. After a predetermined number of revolutions of a wheel, a lever is tripped which rotates a gear having indicia thereon indicating the amount of time elapsed during which the magnetic tape was played.

PATENTED SEP 14 1971

3,604,624

INVENTORS

BY YOTARO MIURA

YOSHIHARU MATSUMOTO

COUNTER FOR A TAPE RECORD-PLAYBACK MECHANISM

Figures 1, 2:
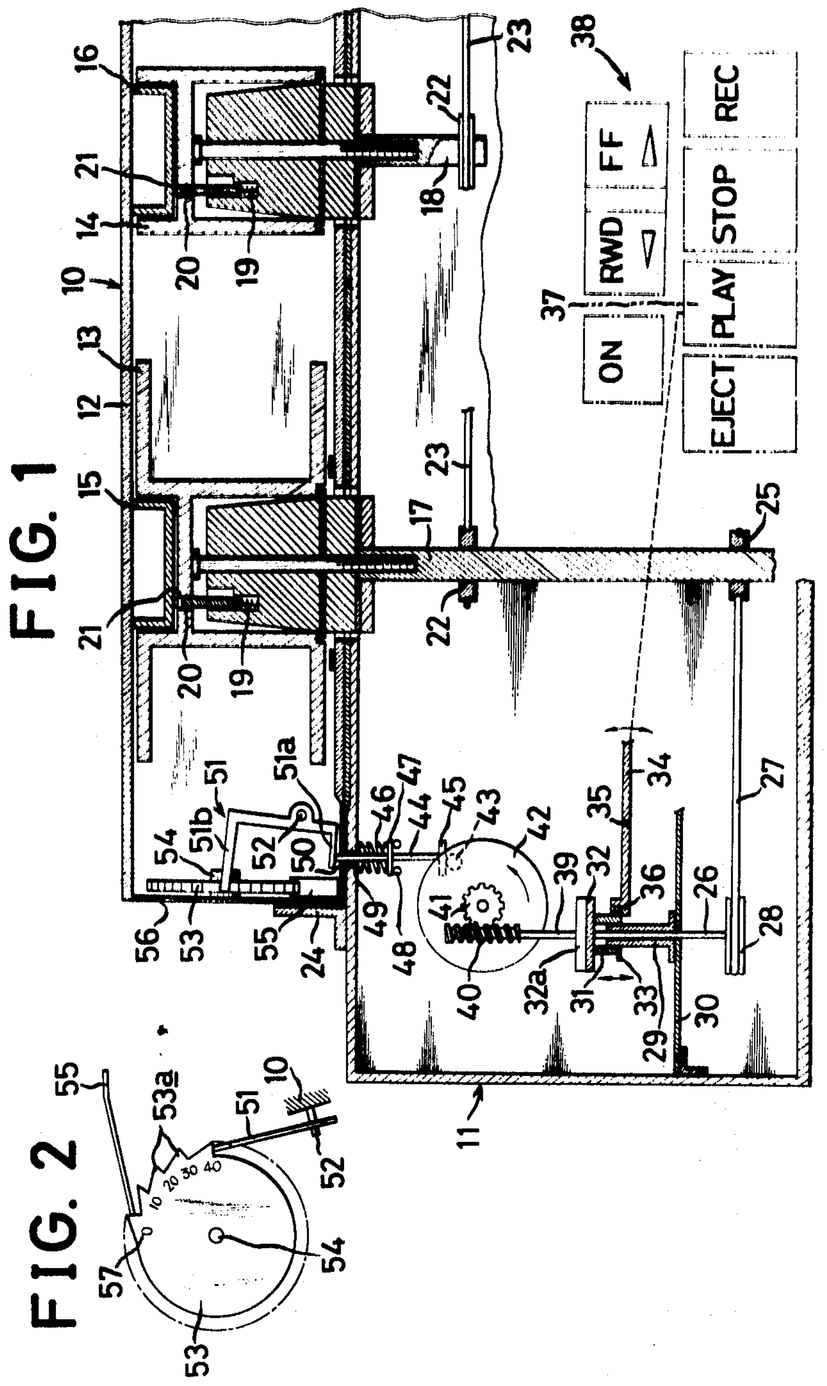

Tape cassettes are well known in the art and basically they include a housing having a tape on reels either in the same plane or in spaced-apart planes. A signal is placed on the tape and a magnetic head scans the tape to reproduce the signal. These prior art cassettes are relatively inexpensive and are purchased from a store. Since the cassettes are so inexpensive, they are not marketed on a rental basis.

With the arrival of the video tape recorder (VTR), a cassette for holding the tape also became a desired means to handle the magnetic tape. The cassettes used with VTR's are not inexpensive, however, because the tape cost is high, and the fees for programming video and audio material on a tape are high. In view of the high cost of these cassettes, it has been found to be economically feasible to rent the cassettes. The price to be paid as a rental fee depends upon the period of time the tape is in actual use. Thus, a system had to be devised which would accurately reflect the time the tape was used.

This invention has solved the problem of keeping an accurate record of playing time by providing a counter which can be incorporated into a tape cassette and which accurately shows the amount of time the magnetic tape was played. This is accomplished by fixing a pulley to the shaft which drives the magnetic tape. This pulley is interconnected with a belt to a second shaft having a clutch thereon. When the tape recorder is in the "play" mode, the clutch engaged with a shaft having a gear thereon which drives a circular plate. The plate has a pin thereon which actuates a lever after a predetermined interval of time has elapsed, for example ten minutes. When the lever is actuated it causes a ratchet wheel to rotate by a small amount. The ratchet wheel has indicia thereon which can be viewed through an opening in the cassette thereby indicating to the user the amount of time which the tape has been played.

It is a principal object of this invention to provide a counter in a tape cassette which will indicate the period of time that the magnetic tape in the cassette was used.

It is another object of the invention to provide a cassette having a counter therein in which the counter is operable only when the cassette is placed on the chassis of the tape record/playback mechanism and it is in the "play" mode.

It is a further object of the invention to provide a simple, inexpensive and easy to fabricate cassette having a counter therein which indicates the amount of time tape in the cassette has been played.

Further objects and advantages of the present invention will become apparent as the following description proceeds, and the features of novelty which characterize the invention will be pointed out with particularity in the claims annexed to and forming a part of this specification.

For a better understanding of the present invention, reference may be had to the accompanying drawings in which:

FIG. 1 is a cross-sectional side view, partly cut away, showing a cassette mounted on a tape record/playback chassis and schematically showing a control panel in phantom lines, and FIG. 2 is a front detail view of a ratchet and pawl in which the ratchet wheel has indicia imprinted thereon.

Referring now to the drawings there is shown in FIG. 1 a cassette 10 mounted on a tape record/playback chassis 11. The cassette 10 is formed by walls 12 which enclose a pair of reels 13 and 14. Magnetic tape is wound on the reels in a known manner. The tape reels can be prevented from moving laterally when the cassette is not on the chassis 11 by utilizing a pair of depending protuberances 15 and 16 which fit into a corresponding depression in each of the reels 13 and 14 respectively. The cassette 10 has spaced openings in the bottom wall of the cassette 10 into which drive shafts 17 and 18 extend so as to drive the reels 13 and 14 in a known manner. For example a pin 20 which is biased upwardly by a spring 19 can fit into an opening 21 in the respective reels 13 and 14. The shafts 17 and 18 can be driven by pulleys 22 which are connected to a drive mechanism such as a motor (not shown) by means of belts 23. The cassette 10 is properly oriented on the chassis 11 by an L-shaped locator 24 which abuts against the sidewall of the cassette 10.

A pulley 25 is fixed to the driven shaft 17 and the rotation of the shaft 17 is linked to the shaft 26 by a belt 27 connecting the shaft 17 with a pulley 28 fixed to the shaft 26. The shaft 26 extends through a sleeve 29 which is anchored to a plate 30 securely attached to the chassis 10. A bushing 31 having a clutch plate 32 secured thereto is reciprocally mounted on the sleeve 29. The bushing has a flange 33 thereon. A lever 34 pivoted about a pin 35 abuts against the flange 33 at its U-shaped end 36. The other end of the shaft is linked in any known manner to the "play" button 37 on the control panel 38 on the chassis 11. The control panel 38 includes the usual control buttons to control the various modes of the tape record/playback mechanism. When the "play" button is depressed, the lever 34 is actuated and the end 36 of the lever 34 moves upwardly thereby putting the clutch plate 32 in contact with the other half of the clutch plate **32*a*. A shaft 39 is fixed to the clutch plate 32*a* and a worm gear 40 is secured to the end of the shaft 39. The worm gear 40 drives a gear 41 or a gear train depending on the gear reduction desired. A plate 42 having an outstanding pin 43 secured thereto is attached to the gear 41 and is thereby rotated therewith. A shaft 44 having a head 45 thereon is located such that the pin 43 will strike the head 45 during one position of its rotation. The shaft is resiliently biased towards the pin 43 by a coil spring 46 having one end bearing against the chassis 11 and the other end resting on a flange 47 secured to the shaft 44. The flange can sit on dowels 48 or any other base which is secured to the chassis 11 so as to serve as a support for the shaft 44. It will be noted that the shaft 44 extends through an opening 49 in the chassis and an aligned opening 50 in the bottom wall of the cassette 10. If desired, the cassette wall can be made thinner at this point to keep the shaft 44 to a minimum in height. A substantially U-shaped lever 51 which is pivotally secured to the chassis 10 by a pin 52 lies in the path of movement of the shaft 44 so as to be pivoted thereby about the pin 52. The shaft 44 abuts against the lower leg 51*a* of the lever 51. The upper leg 51*b* of the lever 51 is parallel to the lower leg 51*a* and extends away from the bight of the U-shaped lever so as to be in the path of the teeth 53*a* on the ratchet wheel 53. The ratchet wheel 53 is rotatably secured to the cassette 10 by a pin 54 attached to the cassette 10. Thus, upward movement of the lever 51 will cause the leg 51*b* to engage a tooth 53*a* on the ratchet wheel 53 and thereby rotate the latter. A stop member 55 secured to the cassette 10 prevents reverse rotation of the ratchet wheel 53 somewhat in the manner of a pawl. The cassette 10 has a window 56 therein on the end wall adjacent the indicia 57 printed on the ratchet wheel 53. When the user peers through the window or opening 56 he can see the indicia which indicates the amount of time or it can indicate the number of times the tape within the cassette 10** has been played.

In actual operation, the user places the cassette 10 on the chassis 11 whereby the shaft 17 engages with the reel 13 and the other shaft engages with the reel 14. The plunger 44 then extends into the cassette through the opening 50.

The user depresses the "play" button and the clutch 34 engages the drive mechanism with the gear 40. The gear 40 is linked to the ember 42 such that, the member 42 will make one revolution after the reel has turned a predetermined number of revolutions which can be converted into a convenient time period such as 10 minutes. Thus, after 10 minutes, the member 42 will have made a complete revolution and the projection 43 will strike the head 45 on the shaft 44 of the plunger. The plunger will be moved against the resilient bias of the spring 46. The shaft 44 abuts against the leg **51*a* of the lever 51 pivotting the lever about the axis 52. The leg 51*b* which is in engagement with a tooth 53*a* on the counter 53, rotates the counter until the leg 51*b* drops into the next tooth 53*a*. The stop 55** prevents reverse rotation of the counter.

The user can determine the period of time the tape was played by looking through the opening 56 where he will see the indicia 57.

While there has been shown and described a particular embodiment of the present invention, it will be apparent to those skilled in the art that various changes and modifications may be made without departing from the invention in its broader aspects. The appended claims cover all such changes and modifications falling within the true spirit and scope of the invention.

What is claimed is:

1. In a cassette for use with a recorder comprising, a. a cassette housing formed by walls, b. reel means in said cassette housing for holding magnetic tape thereon, c. a chassis having drive means located thereon and interconnecting with said reel means to drive the latter, d. a counter having indicia thereon mounted in said cassette adjacent one of said walls, e. a counter-actuating means linked to said drive means whereby rotation of said reel means a predetermined amount of time serves to intermittently actuate the counter-actuating means which thereby gives an indication of the time the magnetic tape was used.

2. In a cassette for use with a recorder as defined in claim 1 in which the drive means on the chassis includes a shaft extending into the cassette through an opening formed therein and into engagement with said reel means and said counter-actuating means is linked to said shaft.

3. In a cassette for use with a recorder as defined in claim 1 in which the counter-actuating means comprises a member mounted for movement within said cassette and adjacent the counter to abut against the counter and motion-transmitting means within the chassis adapted to selectively actuate the member mounted for movement in the cassette after a predetermined period of elapsed time.

4. In a cassette for use with a recorder as defined in claim 3 in which the counter-actuating means comprises a lever pivotally mounted adjacent said counter within said cassette housing.

5. In a cassette for use with a recorder as defined in claim 3 in which the motion transmitting means comprises a gear member in said chassis operatively connected to said drive means, said gear member connected to a movable member, said movable member having means thereon which abuts against a resiliently biased plunger having a portion thereof extending into said cassette through an opening formed therein and abuts against said member mounted for movement within the cassette to selectively move said member and thereby actuate the counter after a predetermined lapse of time.

6. In a cassette for use with a recorder as defined in claim 5 further comprising a clutch mounted on said chassis which selectively connects the drive means to the gear member.

7. In a cassette for use with a recorder as defined in claim 5 in which said movable member and said gear member are interconnected in a timed relationship whereby the movable member moves a predetermined distance after a predetermined number of revolutions of said reel means.

8. In a cassette for use with a recorder as defined in claim 1 further comprising a clutch mounted on said chassis which selectively connects the drive means to the counter-actuating means.

9. In a cassette for use with a recorder as defined in claim 1 in which said one wall has an opening formed therein for viewing said indicia whereby a user is informed of the time which the magnetic tape was used.

10. In a cassette for use with a recorder as defined in claim 1 further comprising a stop means operative connected to said counter to preclude movement of the counter in one direction.